United States Patent
Chen

(10) Patent No.: US 11,371,282 B2
(45) Date of Patent: Jun. 28, 2022

(54) SLAT ANGLE ADJUSTING MECHANISM FOR WINDOW BLIND

(71) Applicant: SHEEN WORLD TECHNOLOGY CORPORATION, Taichung (TW)

(72) Inventor: Po-Yu Chen, Taichung (TW)

(73) Assignee: SHEEN WORLD TECHNOLOGY CORPORATION, Taichung (TW)

(*) Notice: Subject to any disclaimer, the term of this patent is extended or adjusted under 35 U.S.C. 154(b) by 0 days.

(21) Appl. No.: 16/843,008

(22) Filed: Apr. 8, 2020

(65) Prior Publication Data

US 2021/0164291 A1 Jun. 3, 2021

(30) Foreign Application Priority Data

Nov. 29, 2019 (TW) ................................ 108143665

(51) Int. Cl.
| | |
|---|---|
| *E06B 9/32* | (2006.01) |
| *E06B 9/322* | (2006.01) |
| *F16H 57/039* | (2012.01) |
| *F16H 1/16* | (2006.01) |

(52) U.S. Cl.
CPC ............... *E06B 9/322* (2013.01); *F16H 1/16* (2013.01); *F16H 57/039* (2013.01)

(58) Field of Classification Search
CPC .... E06B 9/322; E06B 2009/285; E06B 9/307; E06B 9/76; E06B 9/78; F16H 1/16; F16H 57/039
See application file for complete search history.

(56) References Cited

U.S. PATENT DOCUMENTS

| | | | | |
|---|---|---|---|---|
| 2,657,083 | A * | 10/1953 | Krohm ................. | B60S 1/3459 403/357 |
| 2,832,943 | A * | 4/1958 | Cutler ...................... | F16B 7/22 439/357 |
| 5,092,387 | A * | 3/1992 | King ....................... | E06B 9/303 160/176.1 R |
| 8,910,696 | B2 * | 12/2014 | Wen ........................ | F16D 1/101 160/177 R |
| 10,975,618 | B2 * | 4/2021 | Lin .......................... | E06B 9/32 |
| 2017/0022754 | A1 * | 1/2017 | Nien ....................... | E06B 9/307 |

FOREIGN PATENT DOCUMENTS

TW          482237          4/2002

* cited by examiner

*Primary Examiner* — Thomas C Diaz
(74) *Attorney, Agent, or Firm* — Browdy and Neimark PLLC

(57) ABSTRACT

A slat angle adjusting mechanism for a window blind includes a shell, a worm gear rotatably disposed in the shell, and a rotationally driving unit rotatably disposed in the shell and including combinable first and second rotationally driving shafts. The first rotationally driving shaft is located in the shell and has a worm portion engaged with the worm gear, a cone-shaped abutting portion and an embedding portion with non-circular cross-section, which are connected with the worm portion in order. A top end of the second rotationally driving shaft is located in the shell and has an axial hole with non-circular cross-section and two opposite fastening portions each formed at a terminal end thereof with a hooking claw. As a result, the first and second rotationally driving shafts are combinable by the consumer, preventing themselves and the slats from damage during packaging and transportation.

3 Claims, 5 Drawing Sheets

SLAT ANGLE ADJUSTING MECHANISM FOR WINDOW BLIND

BACKGROUND OF THE INVENTION

1. Field of the Invention

The present invention relates to window blinds and more particularly, to a slat angle adjusting mechanism for a window blind.

2. Description of the Related Art

In order to change the amount of the external light transmitted into the room, the window blind structure is provided therein with a slat angle adjusting mechanism to control the angle of the slats. The conventional slat angle adjusting mechanism primarily includes a shell, a worm gear and a worm. The shell is installed in a top beam of the window blind. The worm gear is rotatably disposed in the shell. An end of the worm is inserted into the shell and engaged with the worm gear. The other end of the worm protrudes out of the shell and is exposed outside the top beam for a turning rod to be hooked thereon, allowing the user uses the aforementioned turning rod to drive the worm to rotate. When the worm is driven to rotate, it drives the worm gear to rotate to adjust the angle of the slats through other transmission members.

However, the worm and the worm gear have been installed in the shell when the product leaves the factory, not for the consumer to assemble them after the purchase, therefore the end of the worm exposed out of the top beam is liable to compress the top slat after the product is packaged. That may cause deformation or damage to the slats, and the worm may be even broken because of collision occurring during transportation. Therefore, it is necessary to improve the aforementioned structure.

In order to resolve the above-mentioned problem, Taiwan Patent No. 482,237 disclosed a structure of a sectional worm. However, the design in the aforementioned patent needs a fastening unit to prevent a linkage member and a driving member of the sectional worm from axially separating from each other, so the structure is relatively more complicated and relatively more inconvenient in assembly, thereby still necessary to be improved.

SUMMARY OF THE INVENTION

It is a primary objective of the present invention to provide a slat angle adjusting mechanism for a window blind, which can be assembled by the consumer, thereby preventing itself from break and preventing the slats from damage during packaging and transportation.

It is another objective of the present invention to provide a slat angle adjusting mechanism for a window blind, which is simple in structure, so that the consumer can assemble the slat angle adjusting mechanism easily.

To attain the above objective, the present invention provides a slat angle adjusting mechanism for a window blind, which includes a shell, a worm gear and a rotationally driving unit. The worm gear is rotatably disposed in the shell. The rotationally driving unit is rotatably disposed in the shell and includes a first rotationally driving shaft and a second rotationally driving shaft. The first rotationally driving shaft is located in the shell and has a worm portion, an abutting portion and an embedding portion. The worm portion is engaged with the worm gear. The abutting portion is cone-shaped. The embedding portion has a non-circular cross-section A top end of the second rotationally driving shaft is located in the shell and has an axial hole with a non-circular cross-section and two opposite fastening portions. Each of the fastening portions is formed at a terminal end thereof with a hooking claw. The first rotationally driving shaft and the second rotationally driving shaft are combinable in a way that the embedding portion of the first rotationally driving shaft is embedded into the axial hole of the second rotationally driving shaft, the fastening portions of the second rotationally driving shaft clutch at a top rim of the abutting portion with the hooking claws after passing the abutting portion and meanwhile a bottom end of the second rotationally driving shaft is located out of the shell.

Preferably, the shell is composed of two half shells coupled with each other; the shell is formed between the two half shells thereof with a first installation trough penetrating through left and right sides of the shell horizontally for accommodating the worm gear, and a second installation trough penetrating through top and bottom sides of the shell inclinedly; the second installation trough is formed from the top side to the bottom side in order with a pivot accommodating section, a positioning section and a connecting section.

Preferably, the first rotationally driving shaft further has a positioning annular protrusion located between the worm portion and the embedding portion and embeddable in the positioning section of the second installation trough.

Preferably, the connecting section of the second installation trough is formed at an end thereof located adjacent to the positioning section with an expanded part with a relatively larger diameter.

Preferably, the cross-section of the embedding portion of the first rotationally driving shaft and the cross-section of the axial hole of the second rotationally driving shaft are both hexagon-shaped.

DETAILED DESCRIPTION OF THE INVENTION

The technology and features of the present invention will be specified in a following embodiment and the appendix drawings. The directional terms mentioned in the contents of the specification, such as 'top', 'bottom', 'left', 'right', 'inside', and 'outside', are just for illustrative description on the basis of normal usage direction, not intended to limit the claimed scope.

Figure 1:
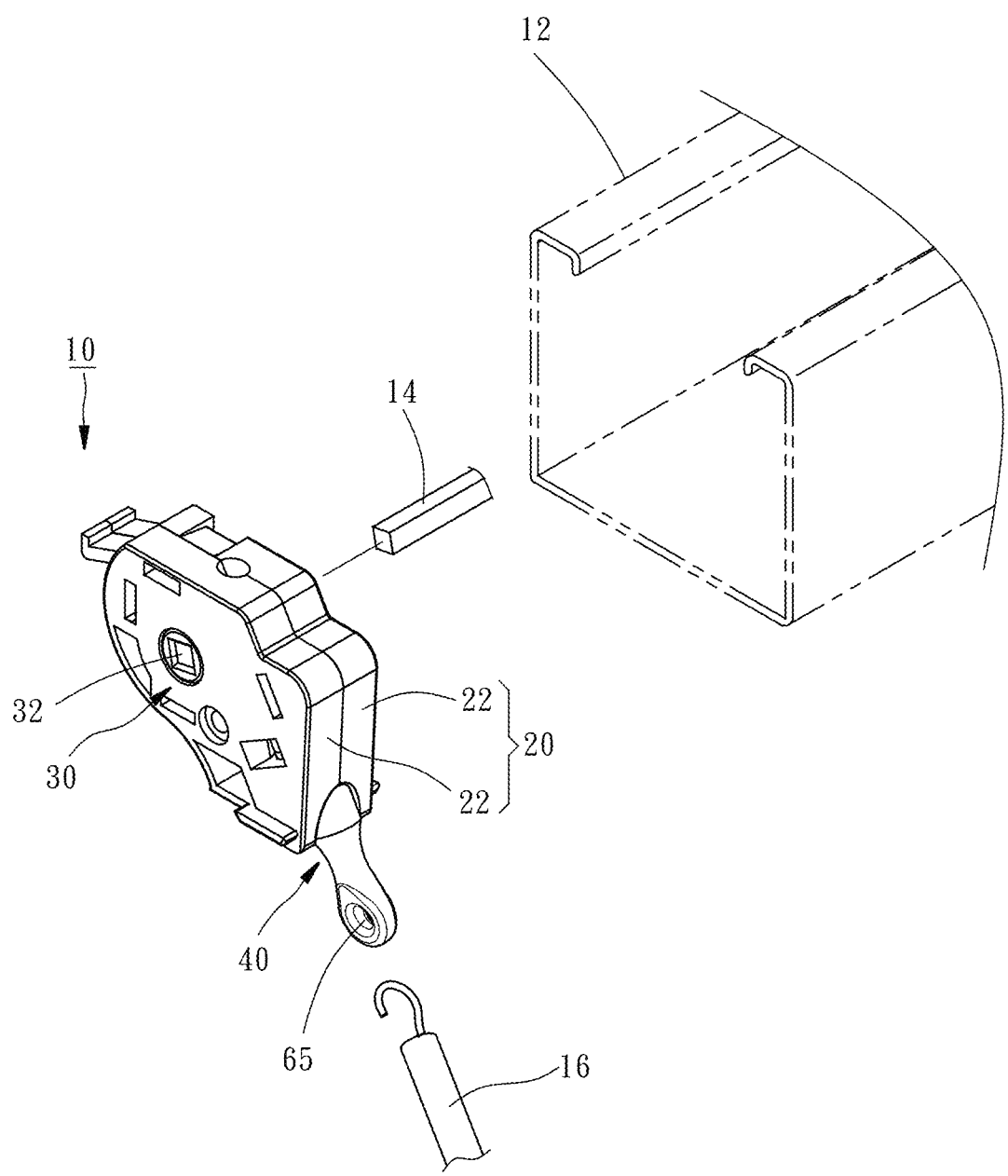
FIG. 1 is a perspective view showing the appearance of a slat angle adjusting mechanism for a window blind of the present invention.
Figure 2:
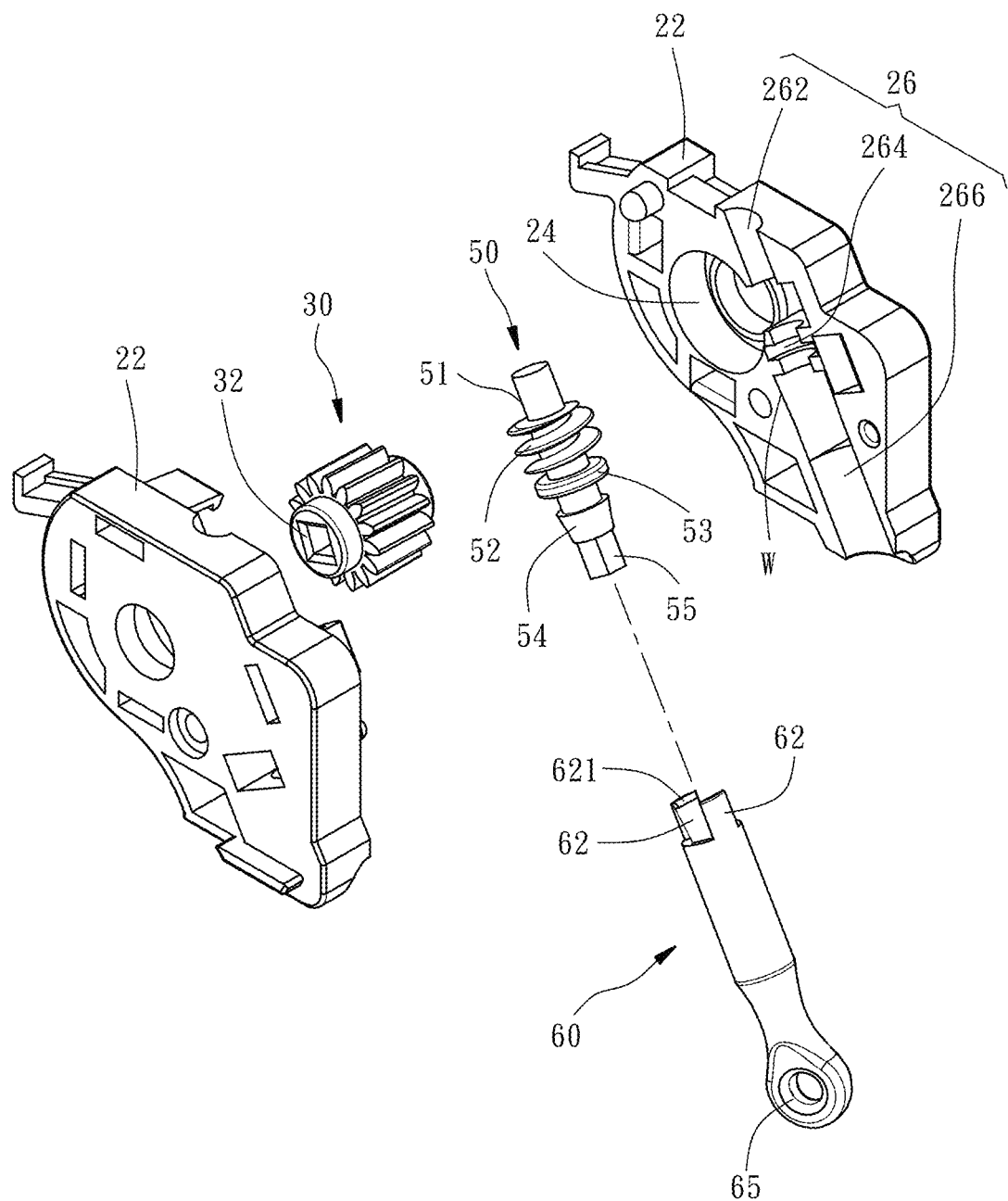
FIG. 2 is an exploded perspective view of the slat angle adjusting mechanism for the window blind of the present invention.

Referring to FIGS. 1-2, a slat angle adjusting mechanism 10 for a window blind of the present invention, which is generally installed in a top beam 12 of the window blind, includes a shell 20, a worm gear 30 and a rotationally driving unit 40.

The shell 20 is composed of two half shells 22 coupled with each other. The shell 20 is formed between the two half shells 22 thereof with a first installation trough 24 penetrating through left and right sides of the shell horizontally and a second installation trough 26 penetrating through top and bottom sides of the shell inclinedly. The second installation trough 26 is formed from the top side to the bottom side in order with a pivot accommodating section 262, a positioning section 264 and a connecting section 266. The connecting section 266 is formed at an end thereof located adjacent to the positioning section 264 with an expanded part W with a relatively larger diameter.

The worm gear 30 is rotatably disposed in the first installation trough 24 of the shell 20 and has a rectangular embedding hole 32 for a rotary shaft 14 to be inserted therein so that the rotary shaft 14 can rotate simultaneously with the worm gear 30.

The rotationally driving unit 40 includes a first rotationally driving shaft 50 and a second rotationally driving shaft 60.

The first rotationally driving shaft 50 is rotatably disposed in the second installation trough 26 of the shell 20 and has a pivot portion 51, a worm portion 52, a positioning annular protrusion 53, an abutting portion 54 and an embedding portion 55. The pivot portion 51 is disposed in the pivot accommodating section 262 of the second installation trough 26. The worm portion 52 is engaged with the worm gear 30. The positioning annular protrusion 53 is exactly embedded in the positioning section 264 of the second installation trough 26, so that the first rotationally driving shaft 50 can only do in place rotation relatively to the second installation trough 26. The abutting portion 54 and the embedding portion 55 are integrally connected with the worm portion 52. The transverse cross-sections of the embedding portion 55 are hexagon-shaped. The axial cross-sections of the abutting portion 54 are cone-shaped.

The second rotationally driving shaft 60 is rotatably attached to the connecting section 266 of the second installation trough 26 of the shell 20. The top end of the second rotationally driving shaft 60 is located in the shell 20 and has a hexagonal axial hole 61 and two opposite fastening portions 62 extending from the top rim of the axial hole 61 upwardly. Each of the fastening portions 62 is formed from a terminal end thereof toward the axis with a hooking claw 621. The fastening portion 62 is shaped as a thin piece, thereby deformable elastically for the convenience of assembly. Besides, the bottom end of the second rotationally driving shaft 60 is located out of the shell 20 and has a hooked hole 65 for a turning rod 16 to be hooked thereon.

Figure 3:
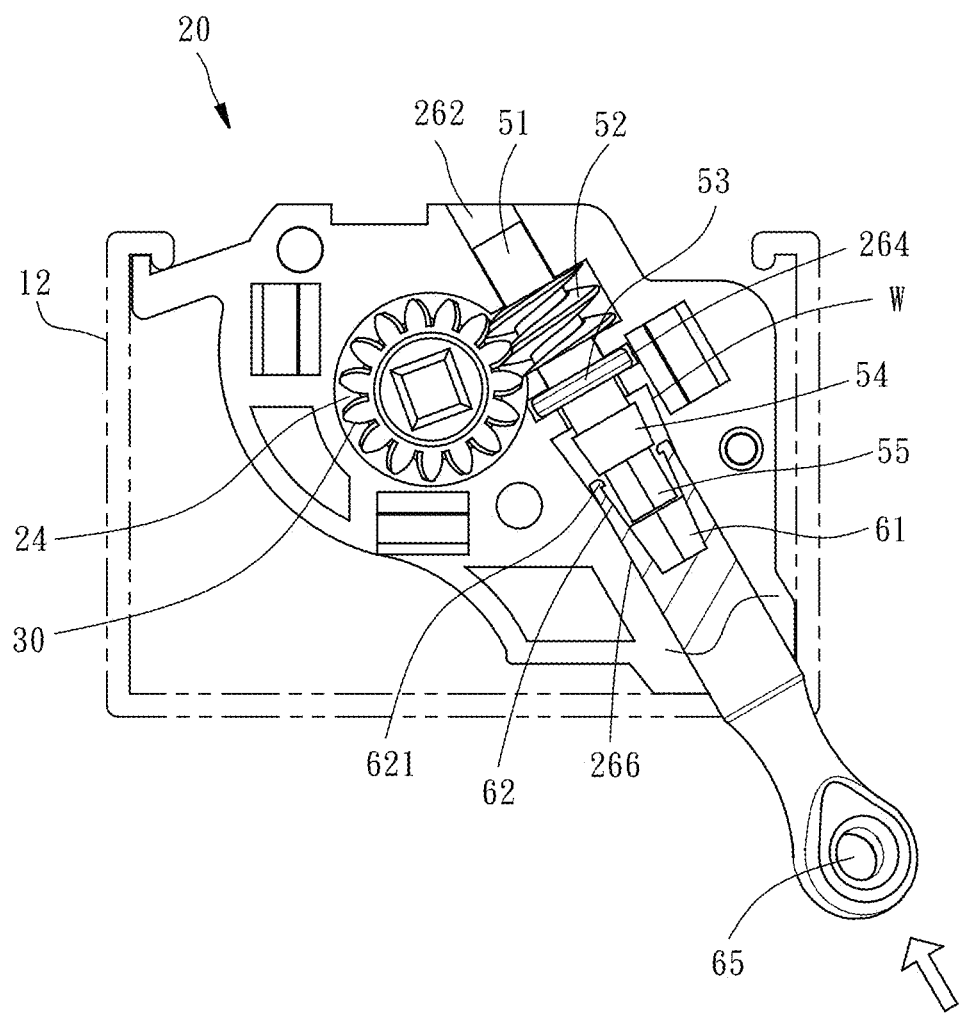
FIG. 3 is a schematic view showing the state before the combining of a first rotationally driving shaft and a second rotationally driving shaft of the slat angle adjusting mechanism for the window blind of the present invention.
Figure 4:
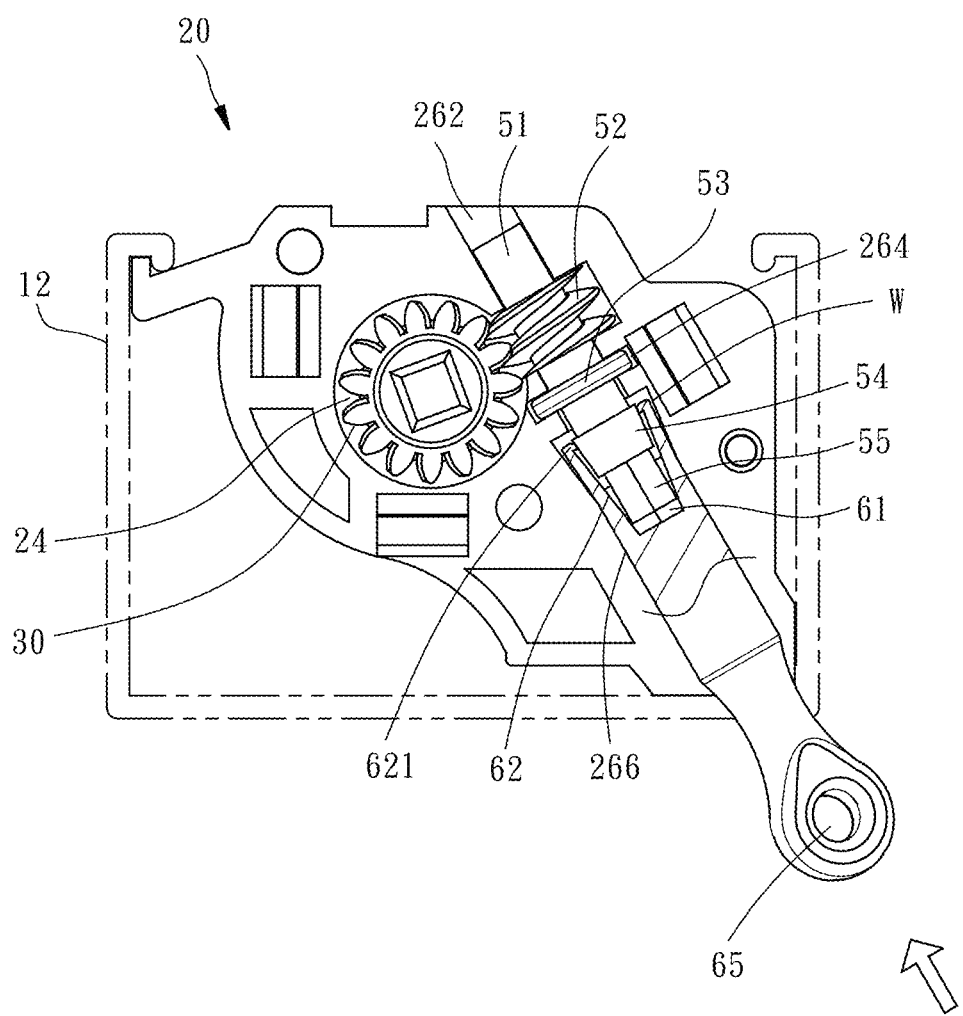
FIG. 4 is a schematic view showing the state during the combining of the first rotationally driving shaft and the second rotationally driving shaft of the slat angle adjusting mechanism for the window blind of the present invention.
Figure 5:
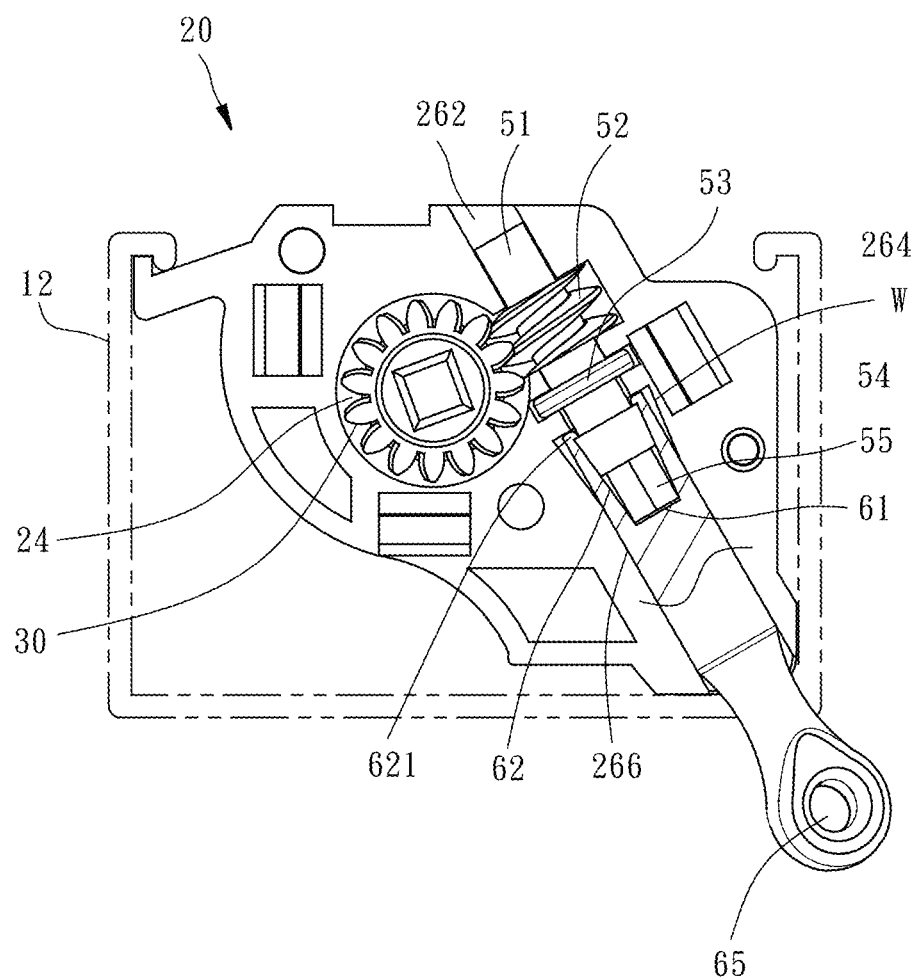
FIG. 5 is a schematic view showing the state after the combining of the first rotationally driving shaft and the second rotationally driving shaft of the slat angle adjusting mechanism for the window blind of the present invention.

Referring to FIGS. 3-5, during the assembly of the first and second rotationally driving shafts 50 and 60, the second rotationally driving shaft 60 is firstly inserted into the connecting section 266 of the second installation trough 26 in a way that the axial hole 61 of the second rotationally driving shaft 60 is aimed at the embedding portion 55 of the first rotationally driving shaft 50, as shown in FIG. 3. Then, the second rotationally driving shaft 60 is pushed upwardly. At this time, because of the upward pushing force, the fastening portions 62 of the second rotationally driving shaft 60 are abutted against the abutting portion 54 of the first rotationally driving shaft 50, and the fastening portions 62 are guided by the cone-shaped abutting portion 54 to deform with an outward expansion, as shown in FIG. 4. After the hooking claws 621 at the terminal ends of the fastening portions 62 passing the abutting portion 54 of the first rotationally driving shall 50, the deformation of the fastening portions 62 is restored as shown in FIG. 5, and the fastening portions 62 clutch at the top rim of the abutting portion 54 of the first rotationally driving shaft 50 with the hooking claws 621, thereby ensuring that the first and second rotationally driving shafts will not separate after the assembly. At this time, the turning rod 16 can be hooked onto the hooked hole 63 of the second rotationally driving shaft 60 and turned by a force, so that the turning rod 16 can drive the worm gear 30 through the second rotationally driving shaft 60. When the worm gear 30 rotates, it drives a transmission member disposed at the other end of the rotary shaft 14 through the rotary shaft 14 to adjust the angle of the slats of the window blind. The transmission member is a conventional member and not shown in the figures.

In the present invention, for ensuring that the first and second rotationally driving shafts 50 and 60 will not rotate relative to each other after the assembly, the axial hole 61 of the second rotationally driving shall 60 and the embedding portion 55 of the first rotationally driving shaft 50 both have non-circular cross-sections. The cross-sections of the axial hole 61 and the cross-sections of the embedding portion 55 are hexagon-shaped in this embodiment, but unlimited thereto, which may be shaped as other polygons.

It can be known from the above description that the worm gear 30 and the first rotationally driving shaft 50 are originally hidden in the shell 20, but the second rotationally driving shaft 60 is an individual separate member for the consumer to combine the second rotationally driving shaft 60 with the first rotationally driving shaft 50 fixedly after purchasing a related window blind product. In other words, the second rotationally driving shaft 60 doesn't protrude out of the shell 20 and the top beam 12, during packaging and transportation. In this way, the second rotationally driving shaft 60 is prevented from break due to an improper external force, and meanwhile the slats are prevented from damage or deformation due to the compression of the second rotationally driving shaft 60.

What is claimed is:

1. A slat angle adjusting mechanism for a window blind, the slat angle adjusting mechanism comprising:
   a shell;
   a worm gear rotatably disposed in the shell; and
   a rotationally driving unit rotatably disposed in the shell and comprising a first rotationally driving shaft and a second rotationally driving shaft, the first rotationally driving shaft being located in the shell and having a worm portion, an abutting portion and an embedding portion, the worm portion being engaged with the worm gear, the abutting portion being cone-shaped, the embedding portion having a non-circular cross-section, a top end of the second rotationally driving shaft being located in the shell and having an axial hole with a non-circular cross-section and two opposite fastening portions, each of the fastening portions being formed at a terminal end thereof with a hooking claw, the first rotationally driving shaft and the second rotationally driving shaft being combinable in a way that the embedding portion of the first rotationally driving shaft is embedded into the axial hole of the second rotationally driving shaft, the fastening portions of the second rotationally driving shaft clutch at a top rim of the abutting portion with the hooking claws after passing the abutting portion and meanwhile a bottom end of the second rotationally driving shaft is located out of the shell, wherein the shell is composed of two half shells coupled with each other; the shell is formed between the two half shells thereof with a first installation trough penetrating through left and right sides of the shell horizontally for accommodating the worm gear, and a second installation trough penetrating through top and bottom sides of the shell inclinedly; the second installation trough is formed from the top side to the bottom side in order with a pivot accommodating section, a positioning section and a connecting section, and wherein the connecting section of the second installation trough is formed at an end thereof located adjacent to the positioning section with an expanded part with a relatively larger diameter.

2. The slat angle adjusting mechanism as claimed in claim 1, wherein the first rotationally driving shaft further has a positioning annular protrusion located between the worm portion and the embedding portion and embeddable in the positioning section of the second installation trough.

3. The slat angle adjusting mechanism as claimed in claim 1, wherein the cross-section of the embedding portion of the first rotationally driving shaft and the cross-section of the axial hole of the second rotationally driving shaft are both hexagon-shaped.

* * * * *